United States Patent [19]

Williams

[11] 4,060,815
[45] Nov. 29, 1977

[54] ELECTRICAL RECORDER AND BELT WITH STYLI THEREFOR

[75] Inventor: George C. Williams, South Easton, Mass.

[73] Assignee: Alden Research Foundation, Westboro, Mass.

[21] Appl. No.: 755,211

[22] Filed: Dec. 29, 1976

[51] Int. Cl.² .......................................... G01D 15/16
[52] U.S. Cl. ............................................. 346/139 A
[58] Field of Search ..................... 346/139 A, 139 C

[56] References Cited

U.S. PATENT DOCUMENTS 2,853,358  9/1958  Bedell .............................. 346/139 A

*Primary Examiner*—George H. Miller, Jr.
*Attorney, Agent, or Firm*—James H. Grover

[57] ABSTRACT

Facsimile recording apparatus for electrically marking graphic signals line by line transversely of a recording web uses a scanning belt carrying styli which traverse a scan line along a recording zone through which the recording web is fed. The belt is composed of one or more sections each having identically spaced perforations or equivalent feed elements, and additional coupling perforations in the same predetermined relation to the feed elements in each section. By joining the belt sections with fasteners extending through the styli and coupling perforations of overlapping belt sections the styli are precisely positioned with respect to each other and to the feed perforations. The fasteners may also serve as signal conductors.

9 Claims, 10 Drawing Figures

ELECTRICAL RECORDER AND BELT WITH STYLI THEREFOR

BACKGROUND OF THE INVENTION

In the art of facsimile recording a web such as electrolytic paper is fed between an elongate linear marking electrode and a scanning electrode which moves repeatedly across the paper transversely of the direction in which the paper is fed. The scanning electrode moves in a path along a recording zone defined by its own path and the edge of the linear electrode which is parallel to the path of the scanning electrode. As the scanning electrode traverses the paper recording web electrical signals applied between the two electrodes mark graphic information on the web, line by line, similarly as television signals are traced on a cathode ray screen.

One form of scanning electrode is a conductive signal marking stylus carried on a belt which conveys the stylus on two or more styli across the web along the recording zone. Examples of such belt-supported styli are found in U.S. Pat. Nos. 2,879,129 to M. Alden, 3,363,261 to K. Maierskofer and 3,369,250 to T. H. Gifft. The scanning belt typically has feed perforations or tooth elements interengaging with a driven pulley, roll or spool, which drives the belt in an orbital path and repeatedly conveys the stylus or styli along the scanning zone across the paper as electrical signals representing successive lines of a frame of graphic information are applied between the stylus and linear electrode during consecutive line scans by the stylus.

One requirement of such belt-supported stylus scanning is that the stylus or styli must start each line scan at the same position transversely of the web as each line of electrical signals is applied. If the transverse starting position of the stylus were to change from line to line in a frame some lines would be offset from others thereby distorting the graphic information in the frame or rendering it illegible. This problem of precisely repeating the stylus starting position at the beginning of consecutive line scans is particularly difficult when two or more styli are mounted on the belt as is usually desirable. For example, with two styli on the belt the spacing between the styli must be the same measured forwardly (or rearwardly) from each stylus in order to insure that a constant speed drive pulley will present each stylus at the same starting position transversely of the recording web at each successive line scan. The correct spacing is not simply a matter of marking measured locations on a belt and positioning the styli at the measured locations. The stylus should be located within a few thousandths of an inch of exact position, an accuracy not consistently achievable by eye. Moreover the stylus must be precisely located with respect to the feed perforations, teeth or other feed elements on the belt.

Accordingly the object of the present invention is to provide a stylus scanning belt whereon the stylus is located with improved accuracy.

STATEMENT OF INVENTION

According to the invention, in graphic recording of electric signals on a web fed through a recording zone, means for scanning the zone comprising a belt having a plurality of equally spaced feed elements between belt ends, and mutually registered coupling perforations at each end in predetermined relation to the equal feed element spacing, a signal marking stylus having apertures registerable with the belt coupling perforations, and means extending through the stylus apertures and coupling perforations for fastening the stylus to the belt and also joining the belt ends with the feed elements of the joined ends at the aforesaid equal feed element spacing and in predetermined relation to the stylus.

DRAWINGS

DESCRIPTION

Figure 1:
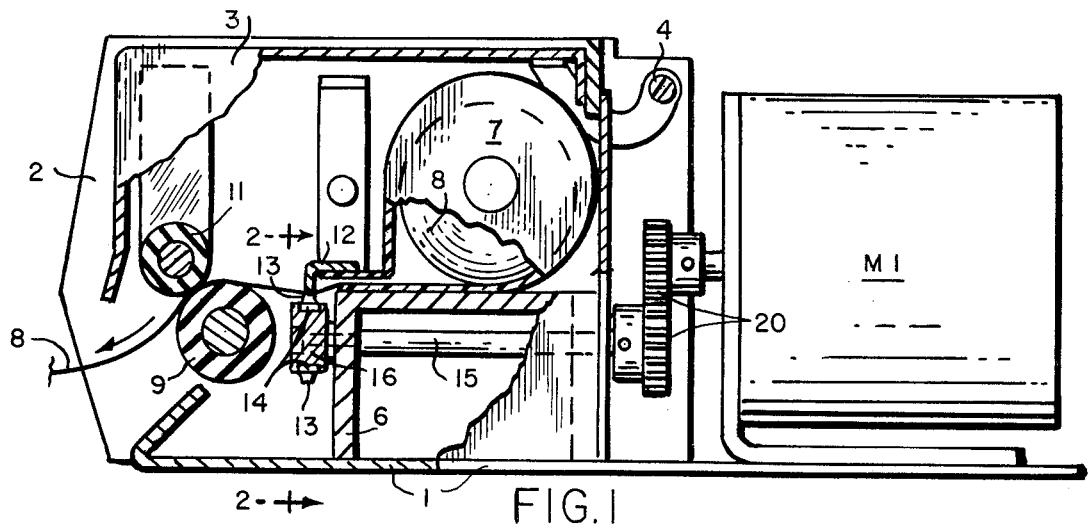
FIG. 1 is a side elevation, partly broken away, of a belted stylus facsimile recorder.

The facsimile recorder shown in FIG. 1 comprises a base 1 with sidewalls 2, of which one is shown, and a cover 3 hinged at 4 to the sidewalls. Within the cover is a bracket 6 which supports a cassette 7 of electrolytic recording paper 8. The paper is drawn from a roll within the cassette by a feed roll 9 and idler roll 11, passing under an elongate, linear marking electrode or blade 12, carried on the cassette as fully described in U.S. Pat. No. 3,875,577 to John M. Alden, which is incorporated herein by reference. As the paper is drawn relatively slowly under the linear electrode 12 it is scanned, line by line, transversely of the direction of paper feed, by styli 13 carried on a belt 14 of insulative material. The assembly, including the bracket 6 which mounts the cassette with its blade 12 and the scanning belt 14 with styli 13, defines an elongate scanning zone between the blade and the path of the styli.

Figure 2:
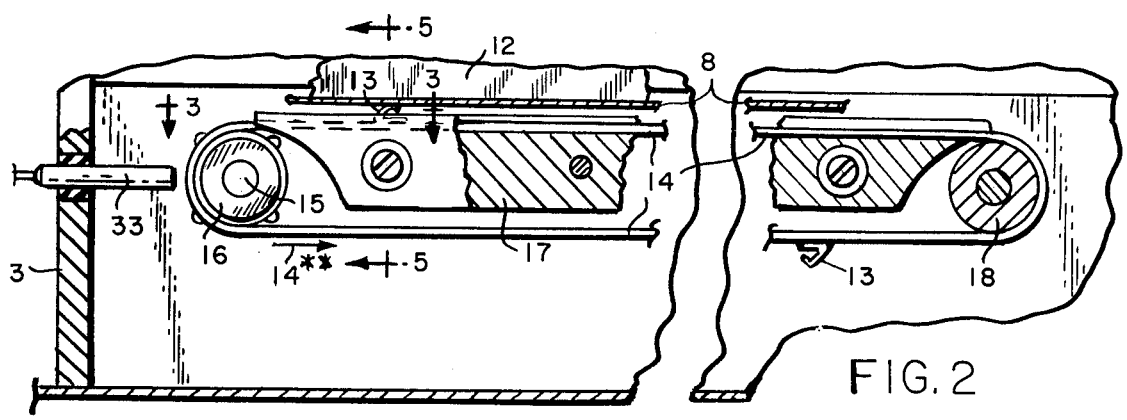
FIG. 2 is a section on line 2—2 of FIG. 1 showing the stylus belt in elevation.
Figure 3:
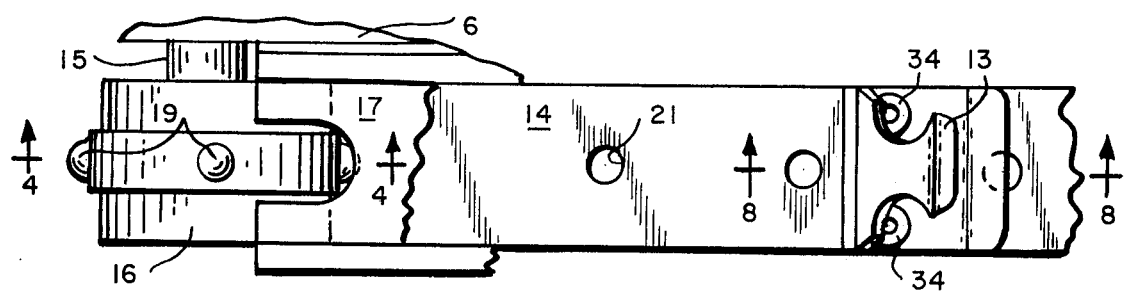
FIG. 3 is a section on line 3—3 of FIG. 2.
Figure 4:
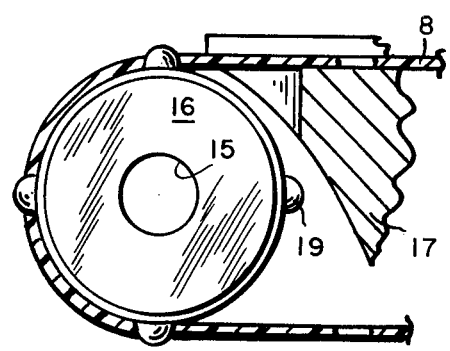
FIG. 4 is a section on line 4—4 of FIG. 3.
Figure 5:
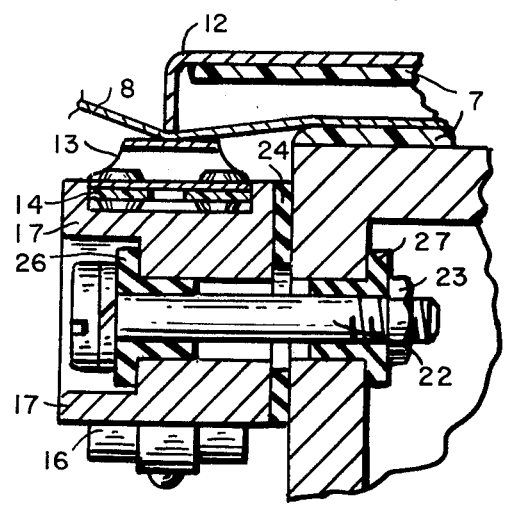
FIG. 5 is a section on line 5—5 of FIG. 2.
Figure 9:
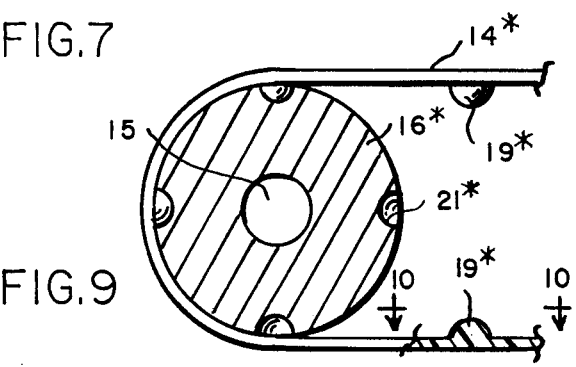
FIG. 9 is a view like FIG. 4 showing an alternative form of belt and feed pulley therefor.
Figure 10:
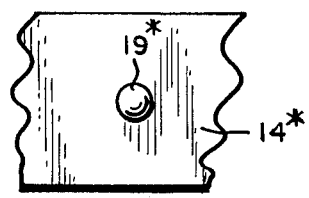
FIG. 10 is a view from line 10—10 of FIG. 9.

As shown in FIG. 2 the belt is orbited in the direction of the arrow 14** on a path along the top and bottom of a guide rail 17 around a drive pulley 16 and an idler pulley 18. The drive pulley 16 is turned on a shaft 15 coupled through gears 20 to a motor M1. As shown in FIGS. 3 and 4 the drive pulley 16 is provided with teeth 19 engaging in feed perforations 21 in the belt, although the feed elements can be reversed, as shown in FIGS. 9 and 10, by providing feed teeth 19* on a modified belt 14* and tooth engaging recesses 21* on a modified drive roll 16*. The guide rail 17 is mounted on the bracket 6 by a bolt 22 and unit 23, but is electrically insulated from the bracket by insulative washers 24, 26 and 27, as shown in FIG. 5.

Figure 6:
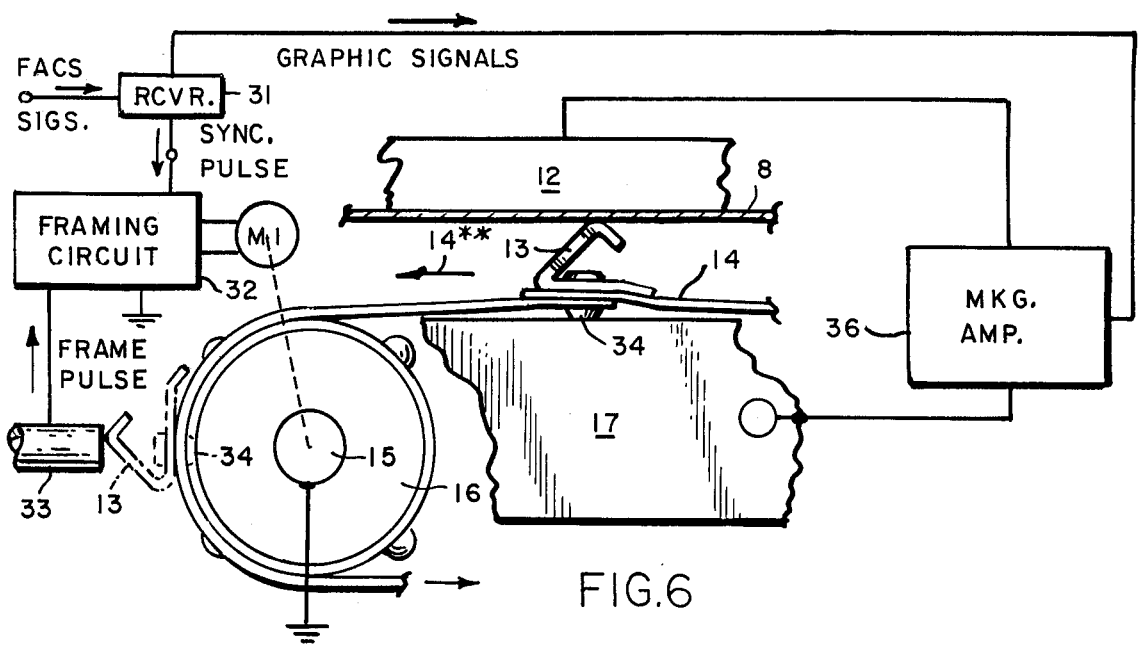
FIG. 6 is a schematic diagram showing electrical circuits in the recorder.

Electronic circuits are shown diagramatically in FIG. 6 which control the synchronization of the scanning belt 14 with incoming facsimile signals (FACS. SIGS.) and which apply the graphic portion of the signals through the styli 13 to the electrolytic paper 8. The incoming facsimile signals transmitted to a receiver (RCVR) 31 consists of a synchronization (SYNC) pulse preceding the many lines of graphic signals making up one frame of graphic information. The sync pulse signals the start of the first line of the frame and it is essential for intelligible recording that the recorder scan, that is one stylus 13, begin its first line traverse of the recording paper at the same time as the sync pulse. For this purpose the sync pulse is separated from the graphic information and applied to a framing circuit 32 which controls the speed of the belt drive motor M1 and its phase relative to the sync pulse. The framing circuit 32 also receives a frame pulse generated by the belt styli 13. Whenever a stylus 13 reaches the phantom position of FIG. 6 on the drive roll 16 at the end of a line scan (in which case there would be no stylus at the solid line position) the stylus makes contact with a button or like terminal 33. The drive roll 16 is grounded and the stylus is electrically connected to the drive roll by conductive eyelets 34 described more fully hereinafter. Thus in the phantom position the stylus contact with the button 33 momentarily completes a sub-circuit in the framing circuit and applies a pulse thereto. As is known in the art, the framing circuit compares the relative timing of the sync pulse and framing pulse and adjusts the phase of the belt drive motor M1 until the two pulses are in phase. Preferably several sync pulses and framing pulses are compared prior to transmission of the graphic signals. The graphic signals are then modified and amplified in a marking amplifier 36 and applied line by line through the electrolytic recording paper 8 in a circuit including the linear electrode 12, the paper 8, the stylus 13, eyelets 34 and guide rail 17 to which the marking amplifier is connected. During graphic recording correct phasing of the belt and the incoming facsimile signals may be maintained by a crystal controlled oscillator in the framing circuit 32 which holds the belt drive motor at a standard speed.

Phasing of the belt drive motor M1 and subsequent crystal speed control will insure that the styli begin successive line scans in phase with the incoming graphic line signals only if the feed perforations are equally spaced throughout the length of the belt, each stylus is located in the same relation to the feed perforations, and the styli are equally spaced along the belt. As previously suggested the stylus spacing tolerance is less than one hundredth of an inch and approaches an accuracy of a few, e.g. 1 to 3, thousandths of an inch, an accuracy which can not be consistently obtained by hand and eye.

Figure 7:
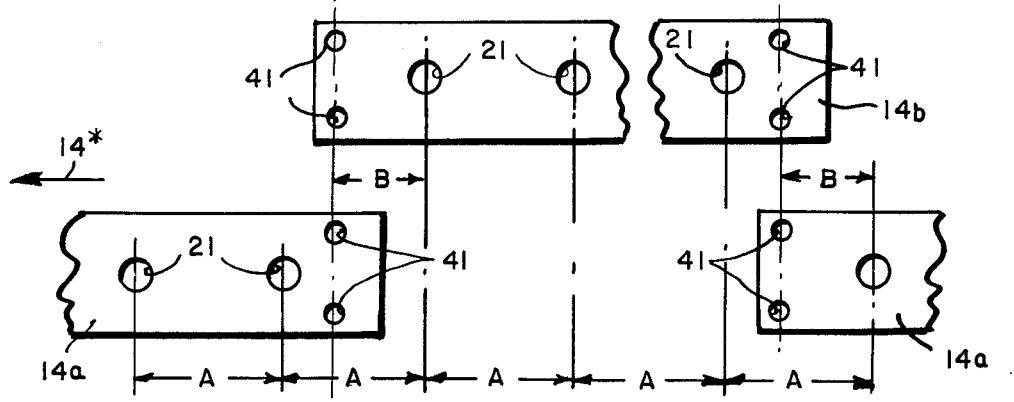
FIG. 7 is a plan view showing the geometric relation of plural belt sections.
Figure 8:
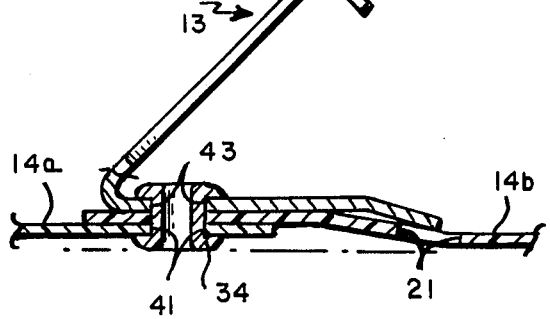
FIG. 8 is an enlarged section on line 8—8 of FIG. 3.

According to the present invention the above conditions for acceptable stylus phasing are achieved by providing a belt having feed perforations, teeth or equivalent feed elements preformed at equal intervals along one or more belt sections. With the example of FIGS. 7 and 8 belt coupling perforations 41 are formed in a predetermined relation to feed perforations 21 in two belt sections 14a and 14b to be joined end to end. The predetermined relation may be expressed concisely as the absolute value of the spacing A of the feed perforations 21 less the distance B lengthwise of the belt between the coupling perforations 41 and the feed perforations. Preferably the feed perforations 34 and coupling perforation 41 are die-formed together in identical belt sections like 14a and 14b. The sections are then joined in an endless loop by eyelets, grommets or the like 34 fastened through overlapping ends of the belt sections. The eyelets also pass through apertures 43 in the stylus, which apertures register with the coupling aperatures 41. Such preforming and fastening of the belt ends and stylus assures that feed perforations will be equally spaced from section to joined section, that the styli at each junction will have the same positional relation to the feed perforations, and most importantly, that the styli will be equally spaced with respect to each other both forwardly and rearwardly of the direction 14** of belt travel. By the latter qualification it is intended to exclude the case of a three section belt wherein the first of three styli is spaced from the second equally as the second is spaced from the third, but the third is not equally spaced from the first stylus as in the present invention.

It should be understood that the present disclosure is for the purpose of illustration only and that this invention includes all modifications and equivalents which fall within the scope of the appended claims.

I claim:

1. In graphic recording of electric signals on a web fed through a recording zone, means for scanning the zone comprising:
    a belt having a plurality of equally spaced feed elements between belt ends, and mutually registered coupling perforations at each end in predetermined relation to the equal feed element spacing,
    a signal marking stylus having apertures registerable with the belt coupling perforations, and
    means extending through the stylus apertures and coupling perforations for fastening the stylus to the belt and also joining the belt ends with the feed elements of the joined ends at the aforesaid equal feed element spacing and in predetermined relation to the stylus.

2. A belt according to claim 1 wherein the coupling perforations in each two joined belt ends have the same spatial relation to the feed elements.

3. A belt according to claim 1 wherein the feed elements are perforations.

4. A belt according to claim 1 wherein the feed elements are protuberances.

5. A belt according to claim 1 wherein the fastening means comprise eyelets.

6. A belt according to claim 1 wherein the fastening means are electrically conductive.

7. A belt according to claim 1 comprising a plurality of identical belt sections and a plurality of joined ends with a stylus at each two joined ends.

8. A belt according to claim 7 wherein the coupling perforations in corresponding ends of each belt section are equally spaced from the feed elements.

9. A belt according to claim 8 wherein the sum of the distance between coupling perforations and feed elements at one end of each belt section and the distance between coupling perforations and feed elements at the other end of each belt section is equal to the spacing between feed elements.

* * * * *